United States Patent
Jones et al.

(10) Patent No.: US 11,591,059 B2
(45) Date of Patent: Feb. 28, 2023

(54) MODULAR HYBRID PROPULSION UNIT FOR WATERCRAFT

(71) Applicant: Jackson Kayak, Inc., Sparta, TN (US)

(72) Inventors: Rick Jones, Thomasville, NC (US); Andy Zimmerman, Greensboro, NC (US)

(73) Assignee: JACKSON KAYAK, INC., Sparta, TN (US)

(*) Notice: Subject to any disclaimer, the term of this patent is extended or adjusted under 35 U.S.C. 154(b) by 114 days.

(21) Appl. No.: 17/024,584

(22) Filed: Sep. 17, 2020

(65) Prior Publication Data
US 2022/0081088 A1     Mar. 17, 2022

(51) Int. Cl.
*B63H 21/20*     (2006.01)
*B63H 21/17*     (2006.01)
*B63J 3/00*      (2006.01)

(52) U.S. Cl.
CPC .......... *B63H 21/20* (2013.01); *B63H 21/17* (2013.01); *B63H 2021/202* (2013.01); *B63J 2003/002* (2013.01); *B63J 2003/005* (2013.01)

(58) Field of Classification Search
CPC .. B63H 16/20; B63H 2016/202; B63H 23/12; B63H 23/14; B63H 21/20; B63H 21/17; B63J 2003/002
See application file for complete search history.

(56) References Cited

U.S. PATENT DOCUMENTS

| 9,914,519 | B2 | 3/2018 | Nutz et al. |
| 2008/0132127 | A1 | 6/2008 | Jansen |
| 2012/0238159 | A1* | 9/2012 | Palvoelgyi ............. B63H 16/14 440/3 |
| 2017/0341718 | A1* | 11/2017 | Zimmerman .......... B63H 16/18 |
| 2018/0251201 | A1 | 9/2018 | Murphy |
| 2019/0283854 | A1* | 9/2019 | Salmon .................. G08C 17/02 |

(Continued)

FOREIGN PATENT DOCUMENTS

WO     2012094686 A2     7/2012

OTHER PUBLICATIONS

ISA United States Patent and Trademark Office, International Search Report Issued in Application No. PCT/US21/71492, dated Feb. 25, 2022, WIPO, 28 pages.

*Primary Examiner* — Andrew Polay
(74) *Attorney, Agent, or Firm* — Alleman Hall Creasman & Tuttle LLP (57) ABSTRACT

A modular hybrid propulsion unit is disclosed that is mountable to a watercraft. According to an example, the modular hybrid propulsion unit includes a housing configured to fit within a complementary housing receiver on a topside of the watercraft, and a rotational output coupling configured to rotationally engage with a rotational input coupling for a propeller of the watercraft. The propulsion unit further includes an electric motor within the housing, the electric motor having a motor shaft connected to the rotational output coupling for providing an electrically powered rotational input to the rotational output coupling. The propulsion unit further includes a crank having one or more crank arms. The crank is connected to the rotational output coupling for providing a human powered rotational input to the rotational output coupling independent of the electrically powered rotational input by the electric motor.

17 Claims, 6 Drawing Sheets

(56) References Cited

U.S. PATENT DOCUMENTS

2021/0061429 A1    3/2021   Kuehmichel
2021/0229790 A1*   7/2021   Cloutier ................. B63H 16/20
2021/0284309 A1    9/2021   Kuehmichel et al.

* cited by examiner

MODULAR HYBRID PROPULSION UNIT FOR WATERCRAFT

BACKGROUND

Recreational watercraft are used in a wide variety of outdoor activities, such as fishing, sightseeing, photography, and exercise. Canoe or kayak paddles are a common mode of propulsion for recreational watercraft. Likewise, some watercraft include pedal-driven or motor-driven propulsion units. Unlike paddle-driven watercraft, pedal-driven or motor-driven watercraft may allow a user to carry out other tasks, such as fishing or photography, while propelling the watercraft through the water.

SUMMARY

A modular hybrid propulsion unit is disclosed that is mountable to a watercraft. According to an example, the modular hybrid propulsion unit includes a housing configured to fit within a complementary housing receiver on a topside of the watercraft, and a rotational output coupling configured to rotationally engage with a rotational input coupling for a propeller of the watercraft. The propulsion unit further includes an electric motor within the housing, the electric motor having a motor shaft connected to the rotational output coupling for providing an electrically powered rotational input to the rotational output coupling. The propulsion unit further includes a crank having one or more crank arms. The crank is connected to the rotational output coupling for providing a human powered rotational input to the rotational output coupling independent of the electrically powered rotational input by the electric motor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Examples of modular hybrid propulsion units are disclosed herein that are mountable to a watercraft. The propulsion unit is capable of independently propelling the watercraft by human power and by an electric motor. According to an example, the modular hybrid propulsion unit includes a housing configured to fit within a complementary housing receiver on a topside of the watercraft, and a rotational output coupling configured to rotationally engage with a rotational input coupling that is connected to a propeller of the watercraft.

The modular hybrid propulsion unit further includes an electric motor within the housing that has a motor shaft that is connected to the rotational output coupling. The electric motor is operable to provide an electrically powered rotational input to the rotational output coupling.

The propulsion unit further includes a crank having one or more crank arms. The crank is connected to the rotational output coupling for providing a human powered rotational input to the rotational output coupling independent of the electrically powered rotational input provided by the electric motor. For example, the crank may include crank arms having pedals to provide pedal-driven propulsion.

The modular hybrid propulsion unit may be disengaged and removed from the watercraft, enabling the watercraft as a system to be configured for particular uses or operating environments. For example, the watercraft may be operated without the modular hybrid propulsion unit, such as by paddle. As another example, a pedal-driven propulsion unit that does not include an electric motor, or a motor-driven propulsion unit that does not include a crank or pedals may be received by and engaged with the watercraft to accommodate additional uses or operating environments.

The modular hybrid propulsion unit may support a variety of operating modes. As a first example, the electric motor may be operated in a forward rotational direction for a forward mode of travel and a reverse rotational direction for a reverse mode of travel of the watercraft.

As a second example, a level of electric assist provided by the electric motor relative to a level of human powered rotational input provided by the crank may be varied responsive to a control input, which may be received via a throttle or other user interface device.

As a third example, a level of electric assist provided by the electric motor may be varied responsive to a human powered rotational input provided by the crank. In this third example, the level of electric assist provided by the electric motor relative to the human powered rotational input via the crank may be based on one of a plurality of selectable electric assist modes selected by the operator of the watercraft. For example, an electronic control system of modular hybrid propulsion unit 130 may support a plurality of selectable electric assist modes that are each configured to provide a respective different level of electric assist via the electric motor responsive to a given human powered rotational input via the crank.

Figure 1:
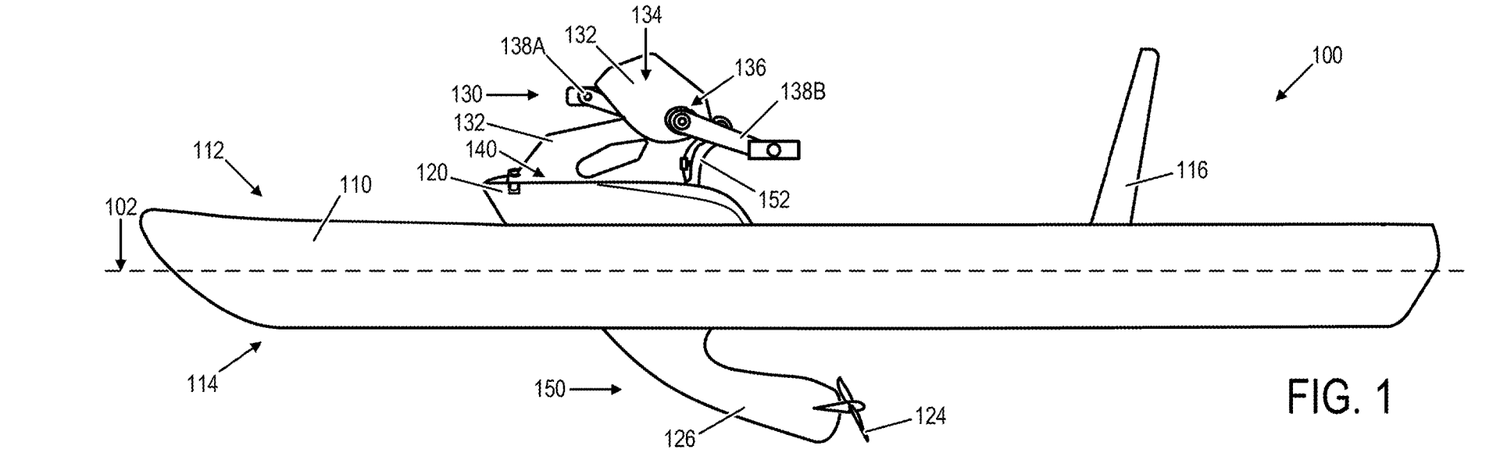
FIG. 1 shows an example watercraft in which a modular hybrid propulsion unit is received by and engaged with a drive unit of the watercraft.
Figure 2:
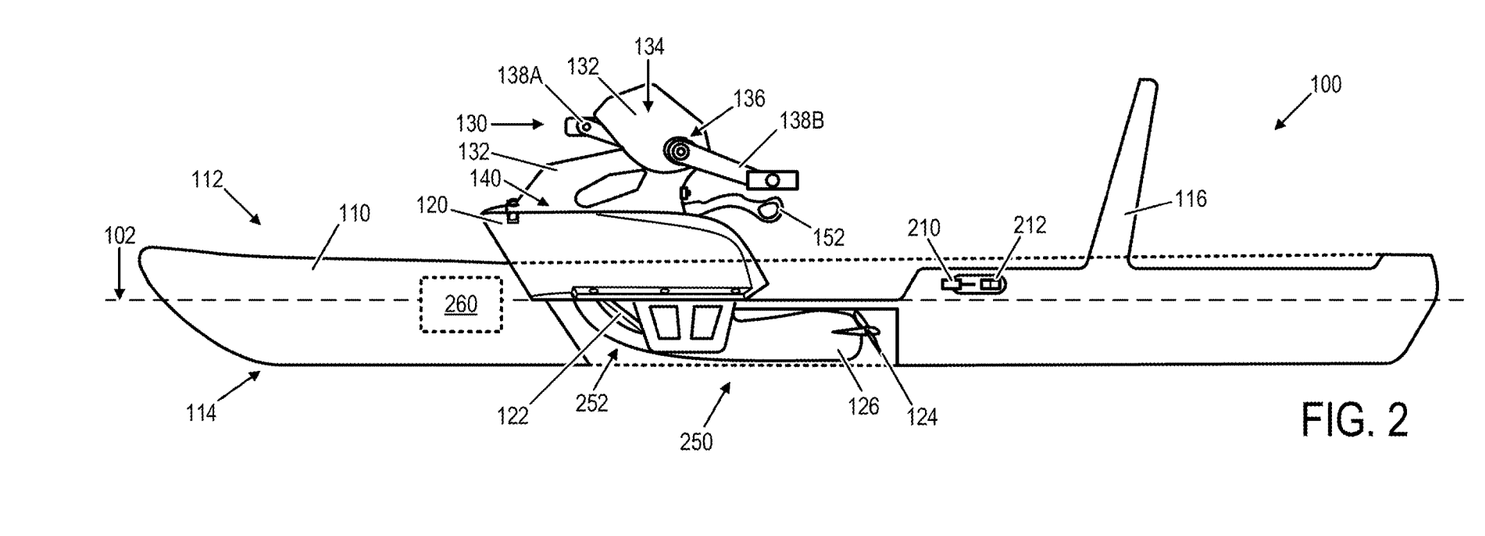
FIG. 2 shows the example watercraft of FIG. 1 in which a daggerboard is retracted relative to the extended position in FIG. 1.

FIGS. 1 and 2 show an example watercraft 100 comprising a hull 110, a drive unit 120 extending through the hull of the watercraft, and a modular hybrid propulsion unit 130 that is received by and engaged with the drive unit. An example waterline 102 is depicted in FIGS. 1 and 2, which generally defines a topside 112 of the watercraft located above the waterline and an underside 114 of the watercraft located below the waterline. In this example, watercraft 100 takes the form of a recreational watercraft for one or more operators and/or passengers. Watercraft 100, for example, may include a seat 116 positioned on the topside 112 for an operator to be seated. It will be understood that watercraft 100 may take other suitable forms beyond the example depicted in FIG. 1.

Drive unit 120 comprises a drive shaft 122 (depicted in FIG. 2) that delivers a rotational input received from modular hybrid propulsion unit 130 to a propeller 124 positioned on the underside of the watercraft. In this example, watercraft 100 includes a daggerboard 126 through which drive shaft 122 passes between engaging with modular hybrid propulsion unit 130 and propeller 124 of drive unit 120 mounted to the daggerboard. An example interface between drive unit 120 and modular hybrid propulsion unit 130 is described in further detail with reference to FIGS. 3 and 4.

Modular hybrid propulsion unit 130 comprises a housing 132, at least a portion of which is configured to be received by a complimentary receiver 140 on the topside of the watercraft. An example of complementary receiver 140 is described in further detail with reference to FIGS. 3-5 in which a portion of housing 132 of propulsion unit 130 fits within complementary receiver 140. Modular hybrid propulsion unit 130 further comprises an electric motor 134 for providing an electrically powered rotational input to drive unit 120, and a crank 136 having one or more crank arms 138A, 138B for providing a human powered rotational input to the drive unit that is independent of the electrically powered rotational input provided by the electric motor.

In at least some examples, daggerboard 126 may be rotatably or pivotally mounted to the hull 110 of watercraft 100 about an axis of rotation, enabling the daggerboard to rotate or pivot relative to the hull. FIG. 1 shows an example of a terminal end of daggerboard 126 to which propeller 124 is mounted being rotated down and away from hull 110 to an extended position 150. FIG. 2 shows an example of the terminal end of daggerboard 126 being rotated up and toward hull 110 to a retracted position 250. In the retracted position 250, propeller 124 and some or all of daggerboard 126 are retracted within a stowage region 252 formed in the underside 114 of hull 110. In examples where daggerboard 126 is rotatably or pivotally mounted to the hull of the watercraft, drive shaft 122 or a portion thereof may take the form of a flexible drive shaft to enable a suitable amount of flexing, bending, or deformation of the drive shaft between the extended position 150 of FIG. 1 and the retracted position 250 of FIG. 2.

Drive unit 120 may include a drive retraction control lever 152 connected to daggerboard 126 that is configured to rotate the daggerboard between extended position 150 and retracted position 250 relative to hull 110. In an example, when lever 152 is rotated toward modular hybrid propulsion unit 130, daggerboard 126 is rotated to the extended position 150. Conversely, when lever 152 is rotated away from propulsion unit 130, the daggerboard is rotated to retracted position 250. However, in other examples, lever 152 may have an opposite relationship to the position of the daggerboard from the preceding example.

Referring to FIG. 2, portions of hull 110 are removed to reveal additional components including additional operator control devices, such as a throttle 210 configured to vary a rotation rate of electric motor 134 to vary the electrically powered rotational input delivered to propeller 124; and a forward and reverse mode selector 212 configured to change a polarity of power supplied to the electric motor to vary a direction of rotation of the electrically powered rotational input delivered to the propeller. Throttle 210 and forward and reverse mode selector 212 are depicted at example locations in FIG. 2 (e.g., mounted to or alongside seat 116). It will be understood that these and/or other operator control devices may be placed in other suitable locations on-board the watercraft. Additionally or alternatively, control inputs may be received via a handheld, mobile device of the operator or other suitable user interface device, such as via an application program executed by the mobile device. A battery 260 is schematically depicted in FIG. 2 located on-board watercraft 100 for supplying electrical power to electric motor 134 and/or other electronic components located on-board the watercraft.

Figure 3:
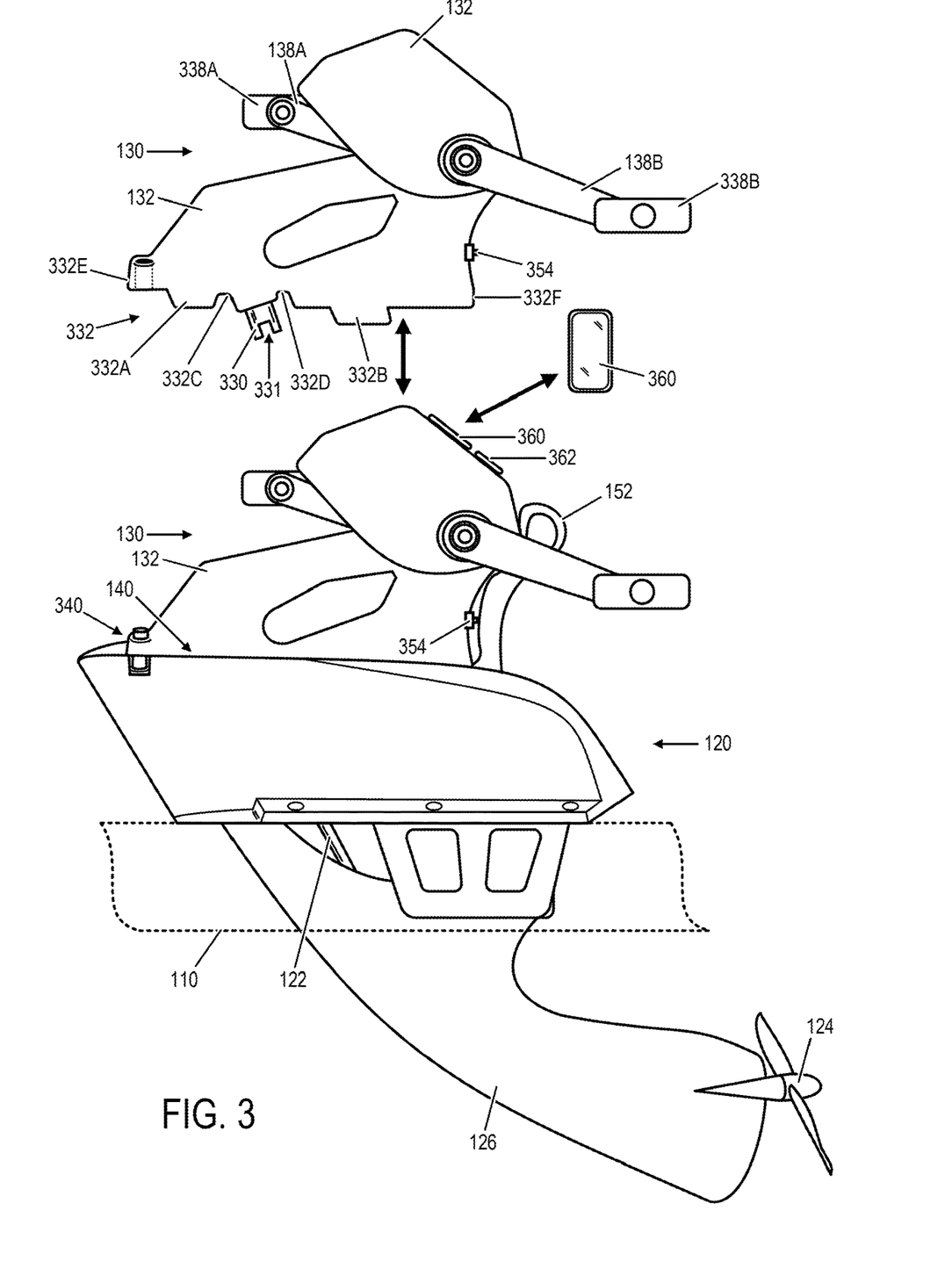
FIG. 3 shows detailed views of the modular hybrid propulsion unit of FIG. 1 both received by and engaged with the drive unit, and disengaged and removed from the drive unit.

FIG. 3 show detailed views of modular hybrid propulsion unit 130 both received by and engaged with the drive unit, and disengaged and removed from the drive unit. A general positioning of hull 110 is depicted in FIG. 3 in simplified form to reveal features of drive unit 120.

Figure 4:
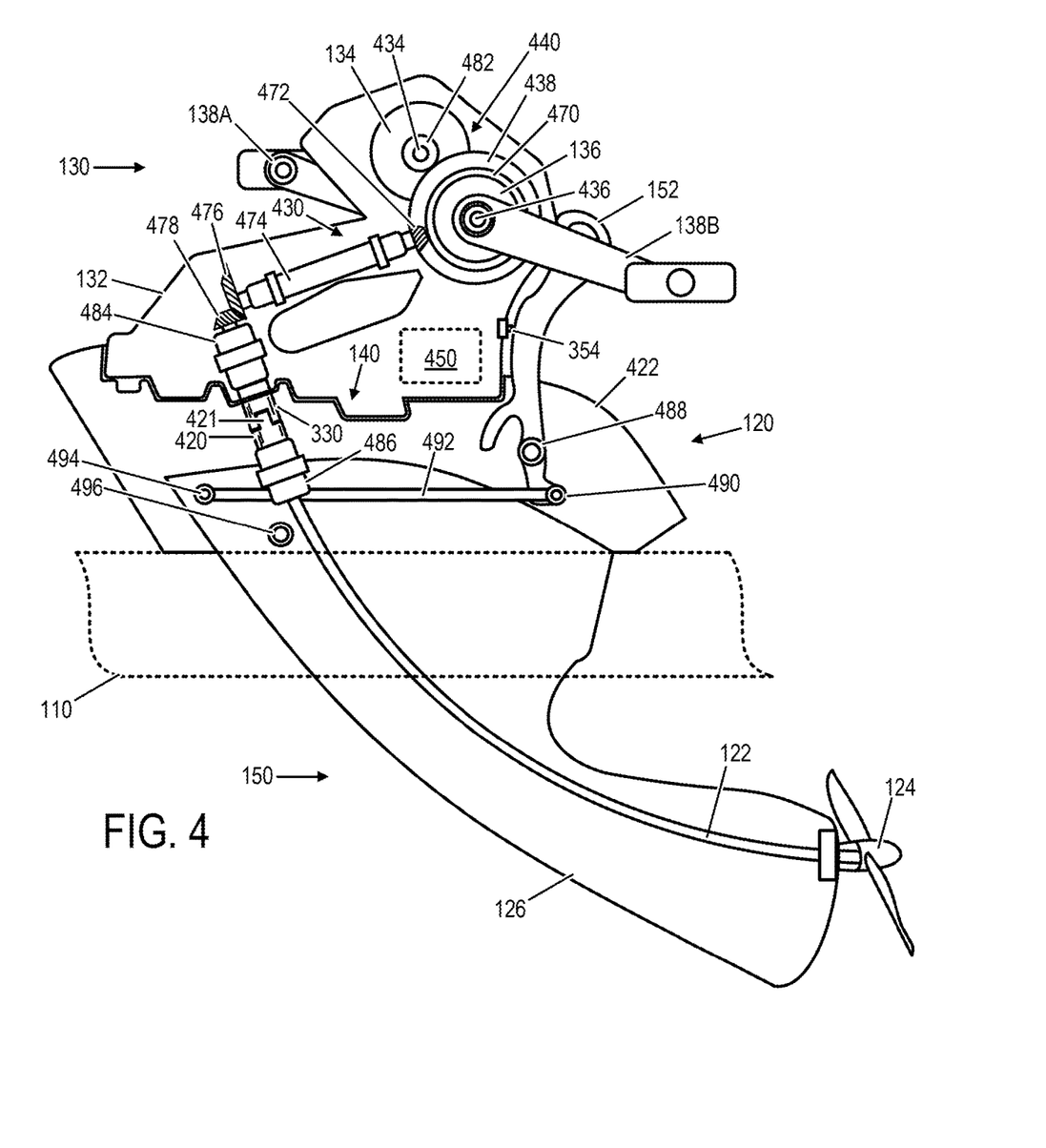
FIG. 4 shows a detailed view of the modular hybrid propulsion unit of FIG. 1 received by and engaged with the drive unit, with interior components of the units revealed within their housings.

In at least some examples, housing receiver 140 forms a receptacle for receiving at least a portion of housing 132. Housing receiver 140 may be formed by a drive unit housing 422 of drive unit 120 and/or hull 110. Housing 132 may form an interfacing shape 332 that conforms to a corresponding interfacing shape 432 of housing receiver 140, an example of which is depicted in FIG. 4. Interfacing shape 332, as an example, may include one or more protruding surfaces 332A, 332B, etc., one or more recessed surfaces 332C, 332D, etc., and one or more edge surfaces 332E, 332F, etc. that engage with corresponding surfaces of interfacing shape 432 of housing receiver 140. A threaded thumb screw 340 or other mechanical fastener may be used to retain modular hybrid propulsion unit 130 within housing receiver 140. For example, thumb screw 340 may be passed through a portion of housing 132 where it is received by a threaded opening formed in drive unit 120 or hull 110.

In at least some examples, drive retraction control lever 152 may engage a power cut off switch 354 when daggerboard 126 is rotated to the retracted position 250 to cut power to electric motor 134. In a first example, power cut off switch 354 may include a removable pin that is connected to lever 152 via a cord or linkage, which causes the pin to be removed from the switch when the lever is rotated away from housing 132. In this example, power to the electric motor is cut when the pin is removed from the switch. In a second example, power cut off switch 354 may include a depressible button or sensor surface that is contacted by the lever 152 or detects presence of the lever (e.g., through magnetic/Hall effect sensing) when daggerboard 126 is rotated to the extended position 150. In this example, power to the electric motor is cut when the lever is rotated away from the button or sensor surface, and the switch is no longer depressed or presence of the lever is no longer detected.

In at least some examples, one or more user interface devices 360, 362, etc. may be mounted to or integrated with housing 132. For example, user interface device 360 may include a peripheral computing device, such as a mobile device that is removable from and useable independently of modular hybrid propulsion unit 130. As another example, a user interface device may include a touch-screen display device that forms part of modular hybrid propulsion unit 130. For example, an electronic control system of modular hybrid propulsion unit 130 may be configured to display a selected electric assist mode via the display device. User interface devices 360, 362 may be used to present operating condition information to an operator of the watercraft and/or to receive control inputs from the operator.

Within FIG. 3, rotational output coupling 330 of modular hybrid propulsion unit 130 is shown where the propulsion unit has been removed and disengaged from drive unit 120. Rotational output coupling 330 is configured to rotationally engage with a rotational input coupling 420 (shown in FIG. 4) of drive unit 120 while the modular hybrid propulsion unit fits within complementary housing receiver 140 of the watercraft. Rotational input coupling 420 of the drive unit is connected to drive shaft 122, which is in-turn connected to propeller 124. In this example, a terminal end of rotational output coupling forms a keyway 331 that accommodates a key 421 of rotational input coupling 420 of FIG. 4. However, rotational output coupling 330 may form other suitable shapes that rotationally engage with a corresponding shape of rotational input coupling 420.

FIG. 4 shows a detailed view of modular hybrid propulsion unit 130 of FIG. 1 received by and engaged with drive unit 120, with interior components of the units revealed within their respective housings. In this example, the terminal end of rotational output coupling 330 is engaged with a corresponding interlocking shape formed in a terminal end of rotational input coupling 420. For example, key 421 projecting from the terminal end of rotational input coupling 420 is accommodated by keyway 331 formed in the terminal end of rotational output coupling 330. Rotational input coupling 420 is mounted to drive shaft 122 via an adapter 486 or drive shaft, in the example depicted in FIG. 4. Adapter 486 may include a bearing that is mounted to drive unit housing 422 of drive unit 120.

When rotational output coupling 330 is engaged with rotational input coupling 420 via their respective interlocking shapes (e.g., key 421 and keyway 331), torque can be transferred between the rotational output coupling and the rotational input coupling. In at least some examples, the interlocking shapes of these rotational couplings do not require or rely upon the couplings being mechanically fastened to each other. This configuration enables modular hybrid propulsion unit 130 to be more easily engaged with and disengaged from drive unit 120 without the use of mechanical fasteners and without requiring the tightening or loosening of fasteners that join rotational output coupling 330 to rotational input coupling 420. The interlocking shapes of these couplings can have any suitable shape that enables the couplings to engage with each other and transfer torque.

Within FIG. 4, crank 136 having a crank shaft 436 is connected to rotational output coupling 330 via a crank drivetrain 430 for providing a human powered rotational input to the rotational output coupling. In an example, crank drivetrain 430 provides a 1:12 ratio between rotation of the crank and rotation of rotational output coupling 330. However, other suitable gear ratios may be used. Crank drivetrain 430 in this example includes an intermediate gear 438 mounted to crank shaft 436, a first drive shaft gear 472 mounted to a drive shaft 474 that engages with the intermediate gear, and a second drive shaft gear 476 mounted to drive shaft 474 that engages with an output gear 478 that is mounted to rotational output coupling 330 via an adapter 480 or driveshaft.

With respect to an interface between intermediate gear 438 and first drive shaft gear 472, the intermediate gear may, for example, include a worm gear and the first drive shaft gear may form a worm to provide a worm drive. As another example, intermediate gear 438 and first drive shaft gear 472 may each include bevel gears.

With respect to an interface between second drive shaft gear 476 and output gear 478, one of the second drive shaft gear and the output gear may, for example, include a worm gear and the other may form a worm to provide a worm drive. As another example, second drive shaft gear 476 and output gear 478 may each include bevel gears.

In at least some examples, crank drivetrain 430 may further include a directional clutch 470 positioned between crank 136 and intermediate gear 438. In an example, directional clutch 470 is configured to provide rotational engagement between crank 136 and intermediate gear 438 when the crank is rotated in a forward rotational direction, and the direction clutch is configured to provide a freewheel or disengagement between the crank and the intermediate gear when the crank is rotated in a rearward rotational direction that is opposite the forward rotational direction.

Within the example of FIG. 4, electric motor 134 is shown within housing 132. Electric motor 134 has a motor shaft 434 that is connected to rotational output coupling 330 via an electric motor drivetrain 440 for providing an electrically powered rotational input to the rotational output coupling. In an example, electric motor 134 is a 250 watt motor. However, other suitable motors may be used. Electric motor drivetrain 440 in this example includes a motor gear 482 mounted to motor shaft 434 that engages with intermediate gear 438 or other suitable gear, which is in-turn connected to rotational output coupling 330 as previously described with reference to crank drivetrain 430. Thus, in this example, intermediate gear 438 may be shared by motor drive train 440 and crank drivetrain 430, enabling a human powered rotational input to the rotational output coupling by 136 crank to be independent of an electrically powered rotational input by electric motor 134.

FIG. 4 further depicts an example connection between drive retraction control lever 152 and daggerboard 126. In this example, drive retraction control lever 152 is mounted to and rotatable relative to drive unit housing 422 of drive unit 120 via an axle 488. Lever 152 may be connected to a first end 490 of linkage 492, and daggerboard 126 may be connected to a second end 494 of linkage 492. Daggerboard 126 may be mounted to and rotatable relative to drive unit housing 422 of drive unit 120 via axle 496. According to the example configuration of FIG. 4, rotation of lever 152 away from housing 132 of modular hybrid propulsion unit 130 causes daggerboard 126 to rotate to retracted position 250 of FIG. 2. Conversely, rotation of lever 152 toward housing 132 of propulsion unit 130 causes daggerboard 126 to rotate to the extended position 150 of FIGS. 1 and 4.

FIG. 4 schematically depicts an electronic control system 450 housed within housing 132 of modular hybrid propulsion unit 130. Electronic control system 450 may be operatively coupled with electric motor 134, throttle 210, forward/reverse mode selector 212, power cut off switch 354, user interface devices 360 and 362, among other electronic components on-board the watercraft. Aspects of electronic control system 450 are described in further detail with reference to FIGS. 6 and 7.

Figure 5:
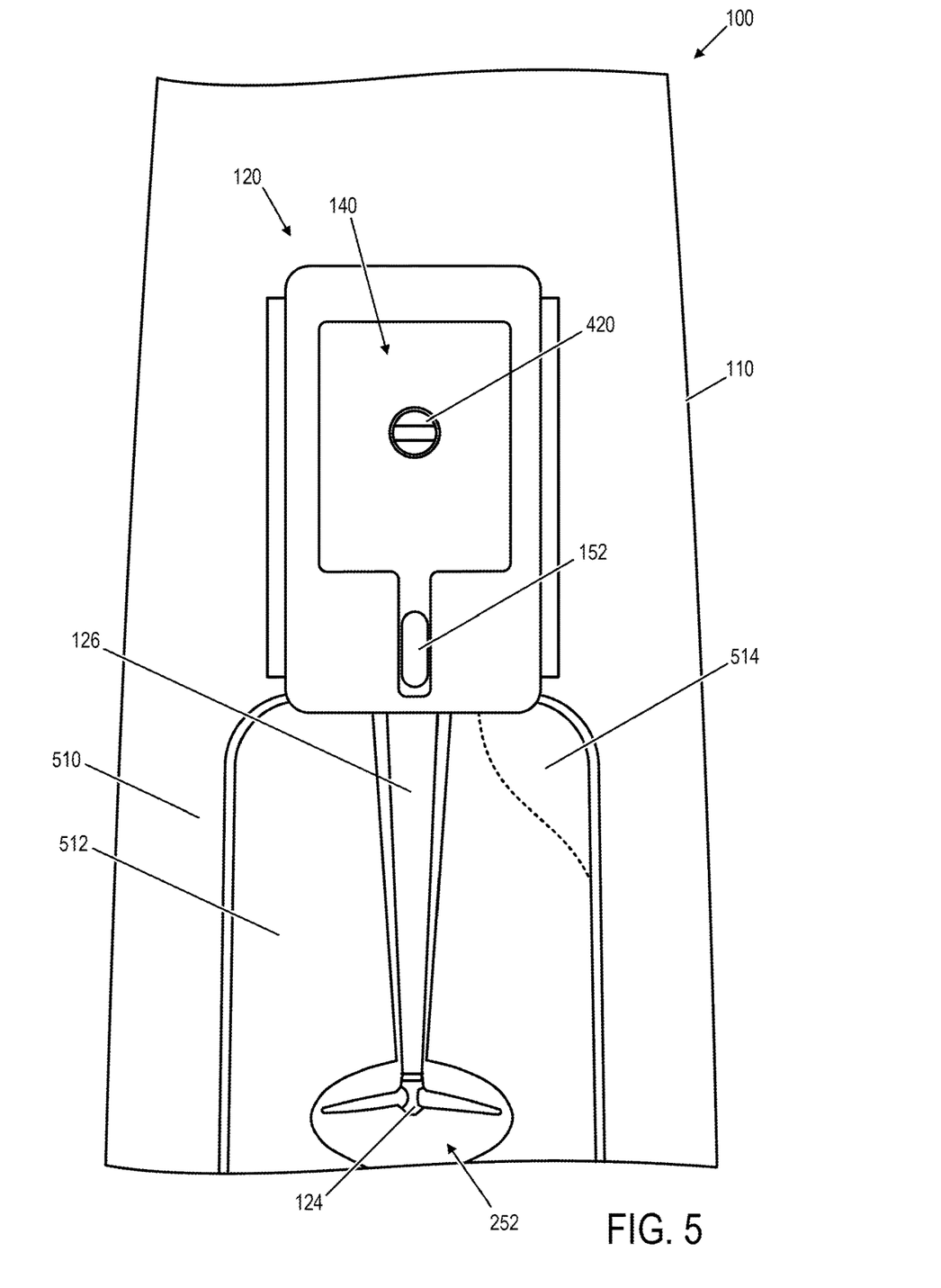
FIG. 5 shows a view from a topside perspective looking down upon a portion of the watercraft of FIG. 1.

FIG. 5 shows a topside perspective of a portion of watercraft 100 providing a view of an example deck 510 of watercraft 100. Within FIG. 5, drive unit 120 is shown along with receiver 140 forming receptacle 140 which is configured to receive and accommodate at least a portion of housing 132 of modular hybrid drive unit 130. Rotational input coupling 420, which is configured to engage with and receive a rotational input from rotational output coupling 330, is accessible from the topside of the watercraft. In at least some examples, hull 110 and/or deck 510 defines a well 512 having a removable cover 514. Stowage region 252 within which propeller 124 and daggerboard 126 may be retracted can be accessible via well 512 from the topside 112 of the watercraft.

Figure 6:
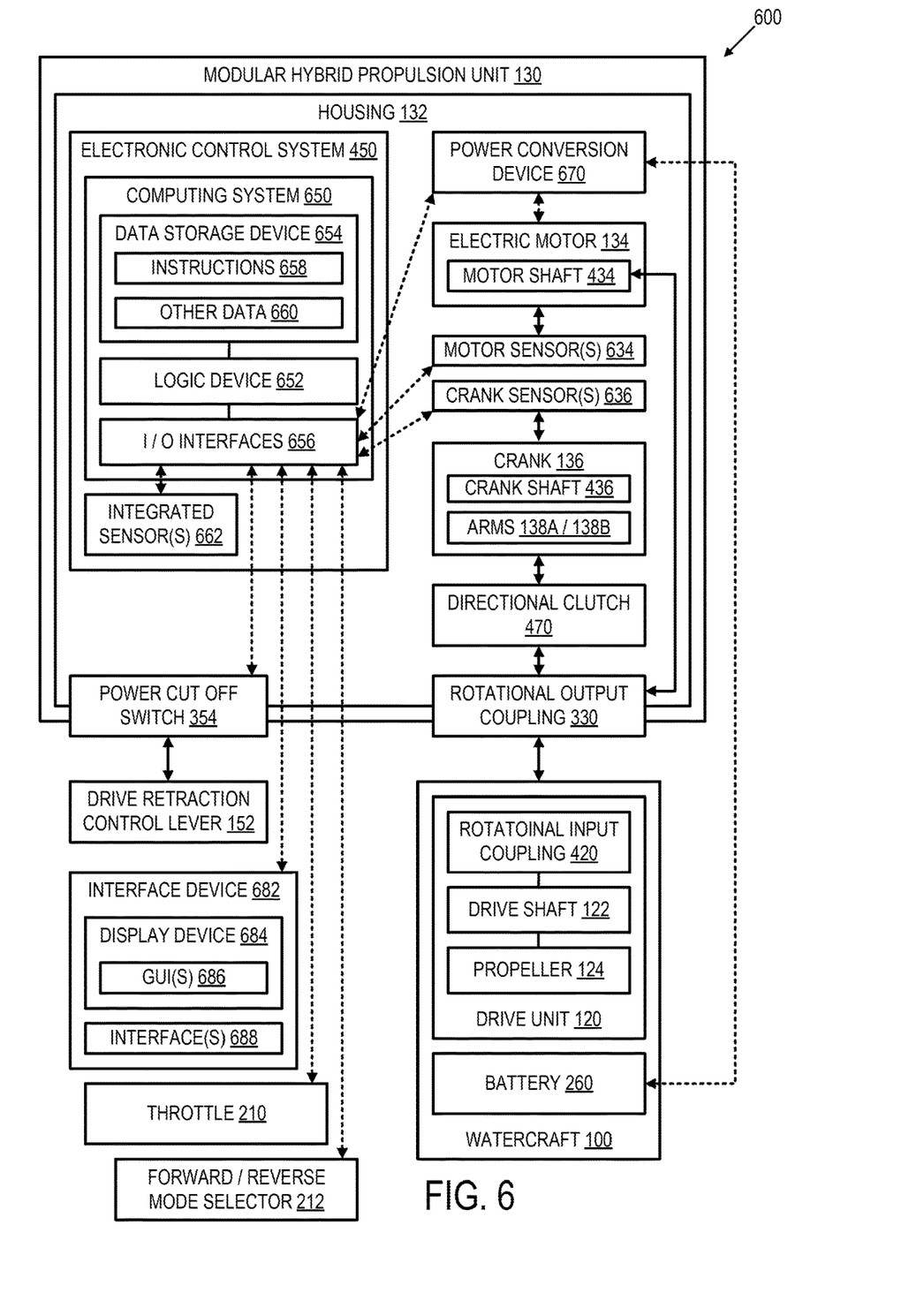
FIG. 6 is a schematic diagram showing components of a watercraft system, including the modular hybrid propulsion unit of FIG. 1.

FIG. 6 is a schematic diagram showing components of a watercraft system 600 that includes watercraft 100, drive unit 120, and modular hybrid propulsion system 130, among other components disclosed herein. Within FIG. 6, for example, system 600 includes modular hybrid propulsion unit 130 that comprises housing 132, motor 134, crank 136, and rotational output coupling 330. In at least some examples, unit 130 may further comprise directional clutch 470 by which crank 136 is coupled to rotational output coupling 330.

Within FIG. 6, rotational output coupling 330 is rotatably engaged with rotational input coupling 420 of drive unit 120 such that rotation of the rotational output coupling rotates drive shaft 122 and propeller 124 of watercraft 100.

Modular hybrid propulsion unit 130 includes electronic control system 450. Electronic control system 450 may include a computing system 650 that includes a logic device 652, a data storage device 654, and input/output interfaces 656. Data storage device 654 may include instructions 658 and other data 660 stored thereon that are executable by logic device 652 to perform one or more operations, such as described in further detail with reference to FIG. 7.

Logic device 652 includes one or more physical hardware processors configured to execute software instructions. Additionally or alternatively, the logic machine may include one or more hardware logic circuits or firmware devices configured to execute hardware-implemented logic or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing.

Data storage device 654 includes one or more physical devices configured to hold instructions and/or other data executable by the logic machine to implement the methods and operations described herein. When such methods and operations are implemented, the state of the data storage device may be transformed—e.g., to hold different data. The data storage device may include physical devices that are removable and/or built-in. The data storage device may include optical memory, semiconductor memory (e.g., ROM, EPROM, EEPROM, FLASH memory, etc.), and/or magnetic memory (e.g., hard-disk drive, floppy-disk drive, tape drive, MRAM, etc.), or other mass storage technology. The data storage device may include nonvolatile, dynamic, static, read/write, read-only, sequential-access, location-addressable, file-addressable, and/or content-addressable devices. It will be appreciated that the data storage device is configured to hold instructions and/or data even when power is cut to the data storage device.

Aspects of logic device 652 and data storage device 654 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

Input/output interfaces 656 of electronic control system 450 may be configured to send or receive control signals or other electronic communications with other devices or components, such as one or more integrated sensors 662 of the electronic control system, power cut off switch 154, a power conversion device 670, one or more motor sensors 634, one or more crank sensors 636, an interface device 682 (as an example of interface devices 360 and 362 of FIG. 3), throttle 210, forward/reverse mode selector 212, etc. Such communications may be via a wired or wireless data connection.

Power conversion device 670, as an example, may be controlled by electronic control system 450 to vary a level of electrical power, voltage, current, phase, and/or other property of electrical energy supplied to electric motor 134 from battery 260 located on-board watercraft 100. Additionally, in at least some examples, power conversion device 670 may be controlled by electronic control system 450 to vary properties of electrical energy supplied to battery 260 on-board the watercraft by electric motor 134 while operated as a generator to charge the battery. Power conversion device 676 may be used by electronic control system 450 to measure a level of electrical energy stored by battery 260.

One or more motor sensors 634 may be used by electronic control system 450 to measure a rotational rate, rotational direction, and/or torque at motor shaft 434, or other property associated with electric motor 134 (e.g., temperature, power consumption, power production, etc.).

One or more crank sensors 636 may be used by electronic control system 450 to measure a rotational rate, rotational direction, and/or torque at crank 136 and/or its crank arms 138A/138B, or other property associated with the crank.

FIG. 6 further depicts drive retraction control lever 152 schematically interacting with power cut off switch 354, which enables electronic control system 450 to determine the position or state of the lever, and to selectively cut power to electric motor 134 based on the position or state of the lever.

Forward/reverse mode selector 212 may be used by electronic control system 450 to selectively engage a forward mode of operation in which motor shaft 434 is rotated in a first rotational direction and a reverse mode of operation in which the motor shaft is rotated in a second rotational direction opposite the first rotational direction of the forward mode.

Throttle 210 may be used by electronic control system 450 to selectively control a level of electrical energy (e.g., power) supplied to electric motor 134 from battery 260, thereby controlling a rotational speed and/or power assist provided by the electric motor to rotational output coupling 330. Additionally or alternatively, one or more crank sensors 636 may be used by electronic control system 450 to selectively control the level of electrical energy supplied to electric motor 134 from battery 260, thereby controlling the rotational speed and/or power assist provided by the electric motor to rotational output coupling 330.

Interface device 682 depicted in FIG. 6 may refer to an example of interface devices 360 and 362 of FIG. 3. As an example, interface device 682 may take the form of a peripheral computing device (e.g., a mobile device) and may similarly include the components previously described with reference to computing system 650. Additionally, interface device 682 may include a display device 684 and one or more other interfaces 688, including input devices and/or output devices. Display device 684 may be used to display one or more graphical user interfaces (GUIs) that contain information relating to operation of modular hybrid propulsion unit 130. In at least some examples, display device 684 may be instead integrated with housing 132 of unit 130 and may be used by electronic control system 450 to display GUIs 686.

Figure 7:
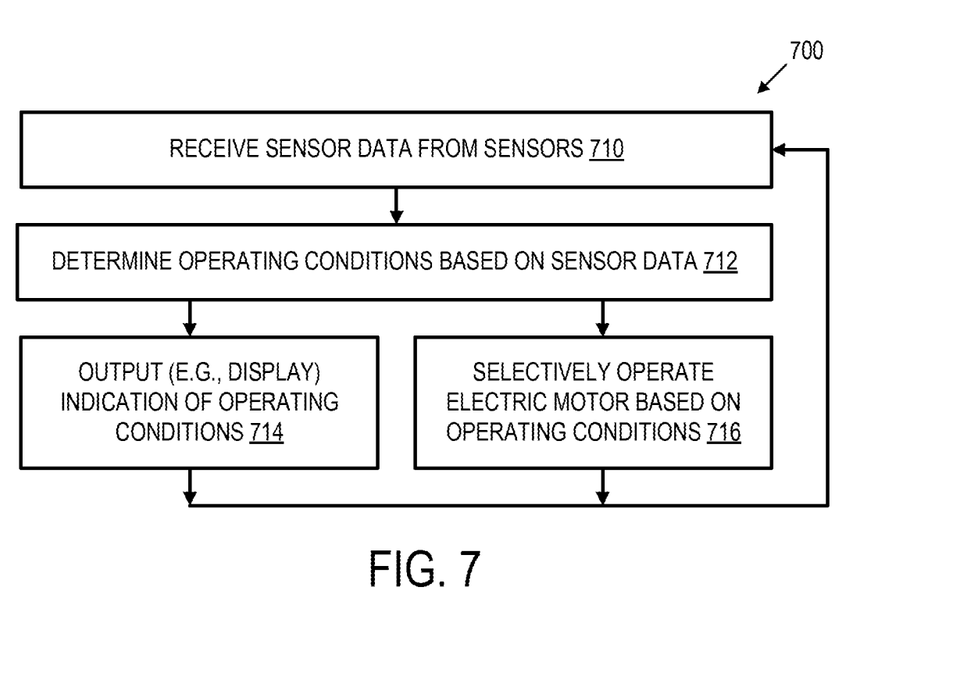
FIG. 7 shows a flow diagram depicting an example method that may be performed by an electronic control system with respect to the modular hybrid propulsion unit of FIG. 1.

FIG. 7 shows a flow diagram depicting an example method 700 that may be performed by an electronic control system with respect to a modular hybrid propulsion unit of a watercraft. As an example, method 700 may be performed by electronic control system 450 with respect to watercraft system 600 of FIG. 6 that includes modular hybrid propulsion unit 130.

At 710, sensor data is received from one or more sensors on-board the watercraft. Examples of sensors from which sensor data may be received include any combination of power cut off switch 154, throttle 210, forward/reverse mode selector 212, motor sensors 634, crank sensors 636, integrated sensors 662, power conversion device 670, a user interface device, and other suitable sensors. The sensor data received at 710 may indicate control inputs by an operator of the watercraft and/or measurements of a state of the watercraft or components on-board the watercraft.

At 712, operating conditions are determined based on the sensor data. Examples of operating conditions include a rotation rate and/or a direction of rotation of electric motor 134, a rotation rate and/or a direction of rotation of the crank 136, a polarity and/or an amount of electrical energy (e.g., power) supplied to the electric motor, a throttle position of throttle 210, a selector position of forward/reverse mode selector 212, a battery charge state of battery 260, etc.

In at least some examples, the operating conditions determined at 712 may include a current operating mode of the modular hybrid propulsion unit, which may be stored at and retrieved from data storage device 654 or from an active process executed by logic device 652. For example, an operator may have previously selected or set an operating mode of the modular hybrid propulsion unit that is stored in a data storage device or is present within an active process implemented by computer hardware on-board the watercraft.

At 714, an indication of the operating conditions determined at 712 may be output via one or more user interface devices. The user interface devices may form part of the modular hybrid propulsion unit, drive unit, or watercraft, or may include peripheral devices of an operator or passenger of the watercraft. As an example, operating conditions may be indicated via a display device, visual indicator light, audible tone, etc. Any of the operating conditions described herein may be indicated via a user interface device. As an example, a current operating mode of the modular hybrid propulsion unit, a battery charge state, a direction of rotation of the motor and/or crank, etc. may be indicated by one or more user interface devices.

At 716, the electric motor may be selectively operated by the electronic control system based on the operating conditions determined at 712. For example, at 716, the electronic control system may be configured to vary the electrically powered rotational input provided to the rotational output coupling by the electric motor responsive to a control input received at 710.

As a first example, the electronic control system may be configured to change a polarity of power supplied to the electric motor to vary the electrically powered rotational input between a forward rotational direction and a reverse rotational direction. This change of the polarity may be performed responsive to a control input received from the forward/reverse mode selector, as an example.

As a second example, the electronic control system may be configured to vary a rotation rate of the electric motor to vary the electrically powered rotational input provided to the drive unit. In this example, the electronic control system may be configured to vary a level of assist provided by the electric motor relative to a level of the human powered rotational input provided via the crank through manipulation of the throttle by an operator of the watercraft.

As a third example, a control input may include a rotation rate of the crank as measured via a crank sensor, and the electronic control system may be configured to vary a rotation rate of the electric motor to vary the electrically powered rotational input provided to the drive unit. In this example, a level of electric assist provided by the electric motor relative to a level of the human powered rotational input provided via the crank may be proportional or may vary over a range of rotation rates of the crank, depending on implementation or a selected operating mode. For example, the electronic control system may support a plurality of selectable electric assist modes (e.g., 5 modes) that are each configured to provide a respective different level of electric assist via the electric motor responsive to a given human powered rotational input provided via the crank.

According to an example of the present disclosure, a watercraft comprises: a hull; a drive unit extending through the hull of the watercraft, the drive unit comprising: a rotational input coupling configured to receive a rotational input, the rotational input coupling accessible from a topside of the watercraft, and a drive shaft connecting the rotational input coupling to a propeller positioned on an underside of the watercraft; and a modular hybrid propulsion unit comprising a housing configured to fit within a complementary receiver on the topside of the watercraft, the modular hybrid propulsion unit further comprising: a rotational output coupling configured to rotatably engage with the rotational input coupling of the drive unit while the modular hybrid propulsion unit fits within the complementary housing receiver, an electric motor having a motor shaft connected to the rotational output coupling for providing an electrically powered rotational input to the rotational output coupling, and a crank having one or more crank arms connected to the rotational output coupling for providing a human powered rotational input to the rotational output coupling independent of the electrically powered rotational input by the electric motor. In an example, the watercraft further comprising an electronic control system configured to vary the electrically powered rotational input provided to the rotational output coupling by the electric motor responsive to a control input. In an example, the electronic control system comprises a forward and reverse mode selector configured to change a polarity of power supplied to the electric motor to vary a direction of rotation of the electrically powered rotational input. In an example, the electronic control system comprises a throttle configured to vary a rotation rate of the electric motor to vary the electrically powered rotational input. In an example, the control input includes a rotation rate of the crank. In an example, the electronic control system is further configured to vary a level of electric assist provided by the electric motor relative to a level of the human powered rotational input. In an example, the watercraft further comprises a display device, wherein the electronic control system is further configured to display a selected electric assist mode via the display device. In an example, the electronic control system is further configured to display a current battery charge state. In an example, the electronic control system is further configured to wirelessly receive the control input as a wireless communication from a mobile device. In an example, the watercraft further comprises a daggerboard rotatably or pivotally mounted to the watercraft, in which the drive shaft passes through the daggerboard between the rotational input coupling and the propeller of the drive unit; a drive retraction control lever connected to the daggerboard and configured to rotate the daggerboard between a retracted position and an extended position relative to the hull; and a power cut off switch configured to cut power to the electric motor while the daggerboard is rotated to the retracted position. In an example, the modular hybrid propulsion unit is removable from the complementary housing receiver. In an example, the crank is connected to the rotational output coupling via a directional clutch that engages with the rotational output coupling when the crank is rotated in a first direction that corresponds to a forward rotation direction of the propeller, and disengages with the rotational output coupling when the crank is rotated in a second direction opposite the first direction that corresponds to a reverse rotation direction of the propeller. In an example, the motor shaft is connected to the rotational output coupling via a direct coupling or a mechanical drivetrain that engages with the rotational output coupling when the motor shaft is rotated in the first direction that corresponds to the forward rotation direction of the propeller, and the second direction opposite the first direction that corresponds to the reverse rotation direction of the propeller.

According to another example of the present disclosure, a modular hybrid propulsion unit is mountable to a watercraft. The modular hybrid propulsion unit comprises: a housing configured to fit within a complementary housing receiver on a topside of the watercraft; a rotational output coupling configured to rotationally engage with a rotational input coupling for a propeller of the watercraft while the modular hybrid propulsion unit fits within the complementary housing receiver of the watercraft; an electric motor within the housing, the electric motor having a motor shaft connected to the rotational output coupling for providing an electrically powered rotational input to the rotational output coupling; and a crank having one or more crank arms, the crank connected to the rotational output coupling for providing a human powered rotational input to the rotational output coupling independent of the electrically powered rotational input by the electric motor. In an example, the modular hybrid propulsion unit further comprises an electronic control system, the electronic control system configured to: vary the electrically powered rotational input provided to the rotational output coupling by the electric motor responsive to a control input. In an example, the electronic control system is configured to vary the electrically powered rotational input by changing a polarity of power supplied to the electric motor responsive to the control input including a change between a forward mode and a reverse mode. In an example, the electronic control system is configured to vary the electrically powered rotational input by varying a rate of rotation of the electric motor responsive to the control input received via a throttle or via the crank. In an example, the electronic control system is further configured to vary a level of electric assist provided by the electric motor relative to a level of the human powered rotational input. In an example, the modular hybrid propulsion unit further comprises: a power cut off switch positioned on an exterior of the housing at a location to be selectively engaged by physical contact by a drive retraction control lever of the watercraft while the modular hybrid propulsion unit fits within the complementary housing receiver; and the electronic control system power is further configured to cut power to the electric motor while the power cut off switch is disengaged.

According to another example of the present disclosure, a method performed by an electronic control system for a modular hybrid propulsion unit of a watercraft comprises: during a first mode of operation, provide an electric motor of the modular hybrid propulsion unit with power of a first polarity to rotate a propeller of the watercraft in a first direction that corresponds to a forward rotation direction of the propeller, and vary a level of electric assist provided by the electric motor by an electrically powered rotational input to rotation of the propeller relative to a level of human powered rotational input received via a crank of the modular hybrid propulsion unit; during a second mode of operation, provide the electric motor of the modular hybrid propulsion unit with power of a second polarity to rotate the propeller of the watercraft in a second direction opposite the first direction; vary operation between the first mode and the second mode responsive to a control input; and cut power to the electric motor responsive to engagement or disengagement of a power cut off switch positioned on an exterior housing of the modular hybrid drive unit.

It will be understood that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A watercraft, comprising:
   a hull;
   a drive unit extending through the hull of the watercraft, the drive unit comprising:
     a rotational input coupling configured to receive a rotational input, the rotational input coupling accessible from a topside of the watercraft, and
     a drive shaft connecting the rotational input coupling to a propeller positioned on an underside of the watercraft; and
   a modular hybrid propulsion unit comprising a housing configured to fit within a complementary receiver on the topside of the watercraft, the modular hybrid propulsion unit further comprising:
     a rotational output coupling configured to rotatably engage with the rotational input coupling of the drive unit while the modular hybrid propulsion unit fits within the complementary housing receiver,
     an electric motor having a motor shaft connected to the rotational output coupling for providing an electrically powered rotational input to the rotational output coupling, and
     a crank having one or more crank arms connected to the rotational output coupling for providing a human powered rotational input to the rotational output coupling independent of the electrically powered rotational input by the electric motors
   a daggerboard rotatably or pivotally mounted to the watercraft, the drive shaft passing through the daggerboard between the rotational input coupling and the propeller of the drive unit;
   a drive retraction control lever connected to the daggerboard and configured to rotate the daggerboard between a retracted position and an extended position relative to the hull; and
   a power cut off switch configured to cut power to the electric motor while the daggerboard is rotated to the retracted position.

2. The watercraft of claim 1, further comprising an electronic control system configured to vary the electrically powered rotational input provided to the rotational output coupling by the electric motor responsive to a control input.

3. The watercraft of claim 2, wherein the electronic control system comprises a forward and reverse mode selector configured to change a polarity of power supplied to the electric motor to vary a direction of rotation of the electrically powered rotational input.

4. The watercraft of claim 2, wherein the electronic control system comprises a throttle configured to vary a rotation rate of the electric motor to vary the electrically powered rotational input.

5. The watercraft of claim 2, wherein the control input includes a rotation rate of the crank.

6. The watercraft of claim 2, wherein the electronic control system is further configured to vary a level of electric assist provided by the electric motor relative to a level of the human powered rotational input.

7. The watercraft of claim 6, further comprising a display device, wherein the electronic control system is further configured to display a selected electric assist mode via the display device.

8. The watercraft of claim 7, wherein the electronic control system is further configured to display a current battery charge state.

9. The watercraft of claim 2, wherein electronic control system is further configured to wirelessly receive the control input as a wireless communication from a mobile device.

10. The watercraft of claim 1, wherein the modular hybrid propulsion unit is removable from the complementary housing receiver.

11. The watercraft of claim 1, wherein the crank is connected to the rotational output coupling via a directional clutch that engages with the rotational output coupling when the crank is rotated in a first direction that corresponds to a forward rotation direction of the propeller, and disengages with the rotational output coupling when the crank is rotated in a second direction opposite the first direction that corresponds to a reverse rotation direction of the propeller.

12. The watercraft of claim 11, wherein the motor shaft is connected to the rotational output coupling via a drivetrain that engages with the rotational output coupling when the motor shaft is rotated in the first direction that corresponds to the forward rotation direction of the propeller, and the second direction opposite the first direction that corresponds to the reverse rotation direction of the propeller.

13. A modular hybrid propulsion unit mountable to a watercraft, the modular hybrid propulsion unit comprising:
a housing configured to fit within a complementary housing receiver on a topside of the watercraft;
a rotational output coupling configured to rotationally engage with a rotational input coupling for a propeller of the watercraft while the modular hybrid propulsion unit fits within the complementary housing receiver of the watercraft;
an electric motor within the housing, the electric motor having a motor shaft connected to the rotational output coupling for providing an electrically powered rotational input to the rotational output coupling;
a crank having one or more crank arms, the crank connected to the rotational output coupling for providing a human powered rotational input to the rotational output coupling independent of the electrically powered rotational input by the electric motors
an electronic control system, the electronic control system configured to vary the electrically powered rotational input provided to the rotational output coupling by the electric motor responsive to a control input; and
a power cut off switch positioned on an exterior of the housing at a location to be selectively engaged by physical contact by a drive retraction control lever of the watercraft while the modular hybrid propulsion unit fits within the complementary housing receiver;
wherein the electronic control system is further configured to cut power to the electric motor while the power cut off switch is disengaged.

14. The modular hybrid propulsion unit of claim 13, wherein the electronic control system is configured to vary the electrically powered rotational input by changing a polarity of power supplied to the electric motor responsive to the control input including a change between a forward mode and a reverse mode.

15. The modular hybrid propulsion unit of claim 13, wherein the electronic control system is configured to vary the electrically powered rotational input by varying a rate of rotation of the electric motor responsive to the control input received via a throttle or via the crank.

16. The modular hybrid propulsion unit of claim 13, wherein the electronic control system is further configured to vary a level of electric assist provided by the electric motor relative to a level of the human powered rotational input.

17. A watercraft, comprising:
a hull;
a drive unit extending through the hull of the watercraft, the drive unit comprising:
a rotational input coupling configured to receive a rotational input, the rotational input coupling accessible from a topside of the watercraft, and
a drive shaft connecting the rotational input coupling to a propeller positioned on an underside of the watercraft; and
a modular hybrid propulsion unit comprising a housing configured to fit within a complementary receiver on the topside of the watercraft, the modular hybrid propulsion unit further comprising:
a rotational output coupling configured to rotatably engage with the rotational input coupling of the drive unit while the modular hybrid propulsion unit fits within the complementary housing receiver,
an electric motor having a motor shaft connected to the rotational output coupling for providing an electrically powered rotational input to the rotational output coupling, and
a crank having one or more crank arms connected to the rotational output coupling for providing a human powered rotational input to the rotational output coupling independent of the electrically powered rotational input by the electric motor;
wherein the crank is connected to the rotational output coupling via a directional clutch that engages with the rotational output coupling when the crank is rotated in a first direction that corresponds to a forward rotation direction of the propeller, and disengages with the rotational output coupling when the crank is rotated in a second direction opposite the first direction that corresponds to a reverse rotation direction of the propeller;
wherein the motor shaft is connected to the rotational output coupling via a drivetrain that engages with the rotational output coupling when the motor shaft is rotated in the first direction that corresponds to the forward rotation direction of the propeller, and the second direction opposite the first direction that corresponds to the reverse rotation direction of the propeller.

* * * * *

UNITED STATES PATENT AND TRADEMARK OFFICE
CERTIFICATE OF CORRECTION

| | |
|---|---|
| PATENT NO. | : 11,591,059 B2 |
| APPLICATION NO. | : 17/024584 |
| DATED | : February 28, 2023 |
| INVENTOR(S) | : Rick Jones and Andy Zimmerman |

It is certified that error appears in the above-identified patent and that said Letters Patent is hereby corrected as shown below:

In the Claims

Claim 1, Line 52, delete "motors" and insert --motor;--

Claim 13, Line 61, delete "motors" and insert --motor;--

Signed and Sealed this
Eighteenth Day of April, 2023

Katherine Kelly Vidal
*Director of the United States Patent and Trademark Office*